US012507187B2

(12) United States Patent
Manolakis et al.

(10) Patent No.: US 12,507,187 B2
(45) Date of Patent: Dec. 23, 2025

(54) SYNCHRONIZATION INFORMATION DETERMINATION WITH RESPECT TO NEIGHBORING CELLS

(71) Applicant: NOKIA TECHNOLOGIES OY, Espoo (FI)

(72) Inventors: Konstantinos Manolakis, Munich (DE); Mads Lauridsen, Gistrup (DK); Jeroen Wigard, Klarup (DK)

(73) Assignee: Nokia Technologies Oy, Espoo (FI)

( * ) Notice: Subject to any disclaimer, the term of this patent is extended or adjusted under 35 U.S.C. 154(b) by 363 days.

(21) Appl. No.: 18/027,734

(22) PCT Filed: Sep. 6, 2021

(86) PCT No.: PCT/EP2021/074469
§ 371 (c)(1),
(2) Date: Mar. 22, 2023

(87) PCT Pub. No.: WO2022/069156
PCT Pub. Date: Apr. 7, 2022

(65) Prior Publication Data
US 2023/0379850 A1 Nov. 23, 2023

(30) Foreign Application Priority Data
Oct. 1, 2020 (EP) ................................ 20199490

(51) Int. Cl.
*H04W 56/00* (2009.01)
(52) U.S. Cl.
CPC ............................. *H04W 56/0015* (2013.01)
(58) Field of Classification Search
CPC .............................................. H04W 56/0015
(Continued)

(56) References Cited

U.S. PATENT DOCUMENTS

2014/0254474 A1   9/2014   Bhaskar et al.
2016/0323800 A1  11/2016   Ulupinar et al.
(Continued)

FOREIGN PATENT DOCUMENTS

CN    110100473 A    8/2019
JP    2022040102 A   3/2022
(Continued)

OTHER PUBLICATIONS

Office Action received for corresponding European Patent Application No. 20199490.2, dated Feb. 21, 2025, 8 pages.
(Continued)

*Primary Examiner* — Robert J Lopata
(74) *Attorney, Agent, or Firm* — Lippes Mathias LLP

(57) ABSTRACT

Devices, methods and computer programs for synchronization information determination with respect to neighboring cells in wireless communications are disclosed. A network node device determines enhanced synchronization information related to neighboring cell(s) of a current cell served by the network node device. The network node device transmits the determined enhanced synchronization information via downlink signaling to at least one client device located in the current cell. A client device receives the enhanced synchronization information via the downlink signaling. The client device determines synchronization status data of the neighboring cell(s) with respect to the current cell based on the received enhanced synchronization information. The client device may perform an accelerated search for at least one of the neighboring cell(s) based on the determined synchronization status data.

11 Claims, 4 Drawing Sheets

(58) Field of Classification Search
USPC ........................................................ 370/329
See application file for complete search history.

(56) References Cited

U.S. PATENT DOCUMENTS

| | | | |
|---|---|---|---|
| 2018/0376438 A1* | 12/2018 | Islam | H04W 72/046 |
| 2020/0154384 A1 | 5/2020 | Chae et al. | |
| 2021/0144596 A1* | 5/2021 | Yang | H04W 52/0248 |
| 2023/0171724 A1* | 6/2023 | Medles | H04W 56/0015 |
| 2023/0354228 A1* | 11/2023 | Kim | H04W 56/0015 |

FOREIGN PATENT DOCUMENTS

| | | |
|---|---|---|
| WO | 2020/041990 A1 | 3/2020 |
| WO | 2020/089471 A1 | 5/2020 |
| WO | 2021/159726 A1 | 8/2021 |

OTHER PUBLICATIONS

International Search Report and Written Opinion dated Dec. 10, 2021 corresponding to International Patent Application No. PCT/EP2021/074469.

Media Tek USA Inc., "Improving Cell Reselection using Next Cell Information in NTN," 3GPP Draft, R2-1908857, 3GPP TSG-RAN WG2 Meeting #107, Prague, Czech Republic, May 26-30, 2019; Aug. 15, 2019, XP051766677.

ZTE Corporation et al., "Utilization of the ephemeris information in cell selection and re-selection," 3GPP Draft; R2-1909261, 3GPP TSG-RAN WG2 Meeting #107, Prague, Czech, Aug. 26-30, 2019, Aug. 15, 2019, XP051767065.

Samsung, "Control Plane Enhancements for Idle and Inactive Modes in an NTN-Overall Observations and Proposals," 3GPP Draft; R2-2006945, 3GPP TSG RAN WG2 Meeting #111, e-Meeting, Aug. 17-28, 2020; Aug. 6, 2020, XP051910889.

Loon et al., "HAPS-Satellite ephemeris broadcast," 3GPP Draft; R2-2006924, 3GPP TSG-RAN WG2 Meeting #111e, Online, Aug. 17-28, 2020; Aug. 6, 2020, XP051911788.

"3rd Generation Partnership Project; Technical Specification Group Radio Access Network; NR; Physical layer procedures for control (Release 16)", 3GPP TS 38.213, V16.2.0, Jun. 2020, pp. 1-176.

"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.

"Solutions for NR to support non-terrestrial networks (NTN)", 3GPP TSG RAN meeting #86, RP-193234, Agenda Item: 9.1.2—Proposals led by RAN2, Thales, Dec. 9-13, 2019, 10 pages.

"3rd Generation Partnership Project; Technical Specification Group Radio Access Network; Solutions for NR to support non-terrestrial networks (NTN) (Release 16)", 3GPP TR 38.821 V16.0.0, Dec. 2019, pp. 1-140.

"System level performance for NR-NTN phase 1 calibration", 3GPP TSG RAN WG1 meeting #98bis, R1-1909981, Agenda Item: 7.2.5.1, MediaTek, Oct. 14-20, 2019, 6 pages.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification Group Radio Access Network; NR; Requirements for support of radio resource management (Release 16)", 3GPP TS 38.133, V16.4.0, Jun. 2020, 1463 pages.

Wang et al., "Near Optimal Timing and Frequency Offset Estimation for 5G Integrated LEO Satellite Communication System", IEEE Access, vol. 7, Aug. 13, 2019, pp. 113298-113310.

Extended European Search Report received for corresponding European Patent Application No. 20199490.2, dated Mar. 23, 2021, 15 pages.

Office Action received for corresponding Indian Patent Application No. 202347030018, dated Feb. 26, 2024, 6 pages.

Office Action received for corresponding Japanese Patent Application No. 2023-520047, dated Mar. 12, 2024, 4 pages of Office Action and 5 pages of summary and translation available.

"Discussion on UL time and frequency synchronization for NTN", 3GPP TSG RAN WG1 #102, R1-2006603, Agenda item: 8.4.2, Xiaomi, Aug. 17-29, 2020, pp. 1-5.

Office action received for corresponding Chinese Patent Application No. 202180067712.3, dated May 20, 2025, 14 pages of office action and no page of translation available.

"On UL Time and Frequency Synchronization Enhancements for NTN", 3GPP TSG-RAN WG1 Meeting #102-e, R1-2005502, Agenda Item: 8.4.2, Ericsson, Aug. 17-28, 2020, pp. 1-13.

Tao et al., "Analysis on Initial Access Process for NR", Mobile Communications, No. 04, Apr. 15, 2019, pp. 31-36.

* cited by examiner

SYNCHRONIZATION INFORMATION DETERMINATION WITH RESPECT TO NEIGHBORING CELLS

TECHNICAL FIELD

The disclosure relates generally to communication networks and, more particularly but not exclusively, to synchronization information determination with respect to neighboring cells.

BACKGROUND

In cellular communication networks, time synchronization is needed for a user equipment (UE) to access the network and establish a data communication link with an infrastructure node, such as a base station. In fifth generation (5G) or so called new radio (NR) wireless networks, downlink (DL) time synchronization is included in an initial access procedure of an UE. The DL time synchronization may comprise the UE detecting a primary synchronization signal (PSS) and a secondary synchronization signal (SSS) sent by the network, and the UE decoding a physical broadcast channel (PBCH). In 5G NR, the pair of PSS/SSS and PBCH may be transmitted together in a synchronization signal block (SSB).

However, if an initial access procedure towards a potential (first) cell fails, the UE typically starts an initial access towards another (second) cell by trying to detect and decode another PSS/SSS pair. Yet, during its attempt towards the first cell, the UE may have already detected and decoded one or more SSBs from that first cell, which have provided to the UE information on the time reference used by the first cell. Similarly, the UE may also have prior time and/or frequency synchronization information if before its attempt to access the first cell it was connected to another (third) cell.

However, traditionally it is not known to the UE whether it can still make use of the timing obtained through SSB decoding from the first cell or from the previous (third) serving cell when it attempts to access the second cell.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a network node device comprises means for performing: determining enhanced synchronization information related to at least one neighboring cell of a current cell served by the network node device; and causing the network node device to transmit the determined enhanced synchronization information via downlink signaling to at least one client device located in the current cell.

In an example embodiment, alternatively or in addition to the above-described example embodiments, the enhanced synchronization information comprises at least one of: a physical cell identification of each of the at least one neighboring cell; a frame synchronization status indicating whether each of the at least one neighboring cell is frame synchronized with the current cell; a frame synchronization time offset between each of the at least one neighboring cell and the current cell; a synchronization signal block time offset within a frame between each of the at least one neighboring cell and the current cell; a frequency offset between synchronization signal blocks in each of the at least one neighboring cell and the current cell; or a time stamp indicating when the enhanced synchronization information is valid.

In an example embodiment, alternatively or in addition to the above-described example embodiments, the downlink signaling comprises at least one of: broadcast signaling via a physical broadcast channel; signaling via a physical downlink control channel; radio resource control signaling; or ephemeris data signaling when the network node device and the at least one client device communicate at least partially via an air/space borne node communication connection.

In an example embodiment, alternatively or in addition to the above-described example embodiments, the network node device and the at least one client device communicate at least partially via an air/space borne node communication connection, and the air/space borne node is utilized as a synchronization reference for the enhanced synchronization information.

In an example embodiment, alternatively or in addition to the above-described example embodiments, the means comprises at least one processor and at least one memory including computer program code. The at least one memory and computer program code are configured to, with the at least one processor, cause the performance of the network node device.

An example embodiment of a method comprises: determining, by a network node device, enhanced synchronization information related to at least one neighboring cell of a current cell served by the network node device; and transmitting, by the network node device, the determined enhanced synchronization information via downlink signaling to at least one client device located in the current cell.

In an example embodiment, alternatively or in addition to the above-described example embodiments, the enhanced synchronization information comprises at least one of: a physical cell identification of each of the at least one neighboring cell; a frame synchronization status indicating whether each of the at least one neighboring cell is frame synchronized with the current cell; a frame synchronization time offset between each of the at least one neighboring cell and the current cell; a synchronization signal block time offset within a frame between each of the at least one neighboring cell and the current cell; a frequency offset between synchronization signal blocks in each of the at least one neighboring cell and the current cell; or a time stamp indicating when the enhanced synchronization information is valid.

In an example embodiment, alternatively or in addition to the above-described example embodiments, the downlink signaling comprises at least one of: broadcast signaling via a physical broadcast channel; signaling via a physical downlink control channel; radio resource control signaling; or ephemeris data signaling when the network node device and the at least one client device communicate at least partially via an air/space borne node communication connection.

In an example embodiment, alternatively or in addition to the above-described example embodiments, the network node device and the at least one client device communicate at least partially via an air/space borne node communication connection, and the air/space borne node is utilized as a synchronization reference for the enhanced synchronization information.

An example embodiment of a computer program comprises instructions for causing a network node device to perform at least the following: determining enhanced synchronization information related to at least one neighboring cell of a current cell served by the network node device; and transmitting the determined enhanced synchronization information via downlink signaling to at least one client device located in the current cell.

An example embodiment of a network node device comprises at least one processor and at least one memory including computer program code. The at least one memory and the computer program code are configured to, with the at least one processor, cause the network node device at least to perform: determining enhanced synchronization information related to at least one neighboring cell of a current cell served by the network node device; and causing the network node device to transmit the determined enhanced synchronization information via downlink signaling to at least one client device located in the current cell.

An example embodiment of a client device comprises means for performing: causing the client device to receive, via downlink signaling, enhanced synchronization information related to at least one neighboring cell of a current cell in which the client device is currently located; and determining synchronization status data of the at least one neighboring cell with respect to the current cell based on the received enhanced synchronization information.

In an example embodiment, alternatively or in addition to the above-described example embodiments, the means are further configured to perform: in response to triggering a cell selection procedure, performing an accelerated search for at least one of the at least one neighboring cell based on the determined synchronization status data.

In an example embodiment, alternatively or in addition to the above-described example embodiments, the enhanced synchronization information comprises at least one of: a physical cell identification of each of the at least one neighboring cell; a frame synchronization status indicating whether each of the at least one neighboring cell is frame synchronized with the current cell; a frame synchronization time offset between each of the at least one neighboring cell and the current cell; a synchronization signal block time offset within a frame between each of the at least one neighboring cell and the current cell; a frequency offset between synchronization signal blocks in each of the at least one neighboring cell and the current cell; or a time stamp indicating when the enhanced synchronization information is valid.

In an example embodiment, alternatively or in addition to the above-described example embodiments, the downlink signaling comprises at least one of: broadcast signaling via a physical broadcast channel; signaling via a physical downlink control channel; radio resource control signaling; or ephemeris data signaling when the client device and a network node device serving the current cell communicate at least partially via an air/space borne node communication connection.

In an example embodiment, alternatively or in addition to the above-described example embodiments, the client device and a network node device serving the current cell communicate at least partially via an air/space borne node communication connection, and the air/space borne node is utilized as a synchronization reference for the enhanced synchronization information.

In an example embodiment, alternatively or in addition to the above-described example embodiments, the synchronization status data comprises at least one of: first synchronization status data indicating which synchronization signal is utilized by each of the at least one neighboring cell; second synchronization status data indicating whether each of the at least one neighboring cell is frame synchronized with the current cell; or third synchronization status data indicating where in time a synchronization signal is being transmitted by each of the at least one neighboring cell.

In an example embodiment, alternatively or in addition to the above-described example embodiments, the means comprises at least one processor and at least one memory including computer program code. The at least one memory and computer program code are configured to, with the at least one processor, cause the performance of the client device.

An example embodiment of a method comprises: receiving, by a client device via downlink signaling, enhanced synchronization information related to at least one neighboring cell of a current cell in which the client device is currently located; and determining, by the client device, synchronization status data of the at least one neighboring cell with respect to the current cell based on the received enhanced synchronization information.

In an example embodiment, alternatively or in addition to the above-described example embodiments, the method further comprises: in response to triggering a cell selection procedure, performing, by the client device, an accelerated search for at least one of the at least one neighboring cell based on the determined synchronization status data.

In an example embodiment, alternatively or in addition to the above-described example embodiments, the enhanced synchronization information comprises at least one of: a physical cell identification of each of the at least one neighboring cell; a frame synchronization status indicating whether each of the at least one neighboring cell is frame synchronized with the current cell; a frame synchronization time offset between each of the at least one neighboring cell and the current cell; a synchronization signal block time offset within a frame between each of the at least one neighboring cell and the current cell; a frequency offset between synchronization signal blocks in each of the at least one neighboring cell and the current cell; or a time stamp indicating when the enhanced synchronization information is valid.

In an example embodiment, alternatively or in addition to the above-described example embodiments, the downlink signaling comprises at least one of: broadcast signaling via a physical broadcast channel; signaling via a physical downlink control channel; radio resource control signaling; or ephemeris data signaling when the client device and a network node device serving the current cell communicate at least partially via an air/space borne node communication connection.

In an example embodiment, alternatively or in addition to the above-described example embodiments, the client device and a network node device serving the current cell communicate at least partially via an air/space borne node communication connection, and the air/space borne node is utilized as a synchronization reference for the enhanced synchronization information.

In an example embodiment, alternatively or in addition to the above-described example embodiments, the synchronization status data comprises at least one of: first synchronization status data indicating which synchronization signal is utilized by each of the at least one neighboring cell; second synchronization status data indicating whether each of the at least one neighboring cell is frame synchronized with the current cell; or third synchronization status data indicating where in time a synchronization signal is being transmitted by each of the at least one neighboring cell.

An example embodiment of a computer program comprises instructions for causing a client device to perform at least the following: receiving via downlink signaling enhanced synchronization information related to at least one neighboring cell of a current cell in which the client device is currently located; and determining synchronization status data of the at least one neighboring cell with respect to the current cell based on the received enhanced synchronization information.

An example embodiment of a client device comprises at least one processor and at least one memory including computer program code. The at least one memory and the computer program code are configured to, with the at least one processor, cause the client device at least to perform: causing the client device to receive, via downlink signaling, enhanced synchronization information related to at least one neighboring cell of a current cell in which the client device is currently located; and determining synchronization status data of the at least one neighboring cell with respect to the current cell based on the received enhanced synchronization information.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
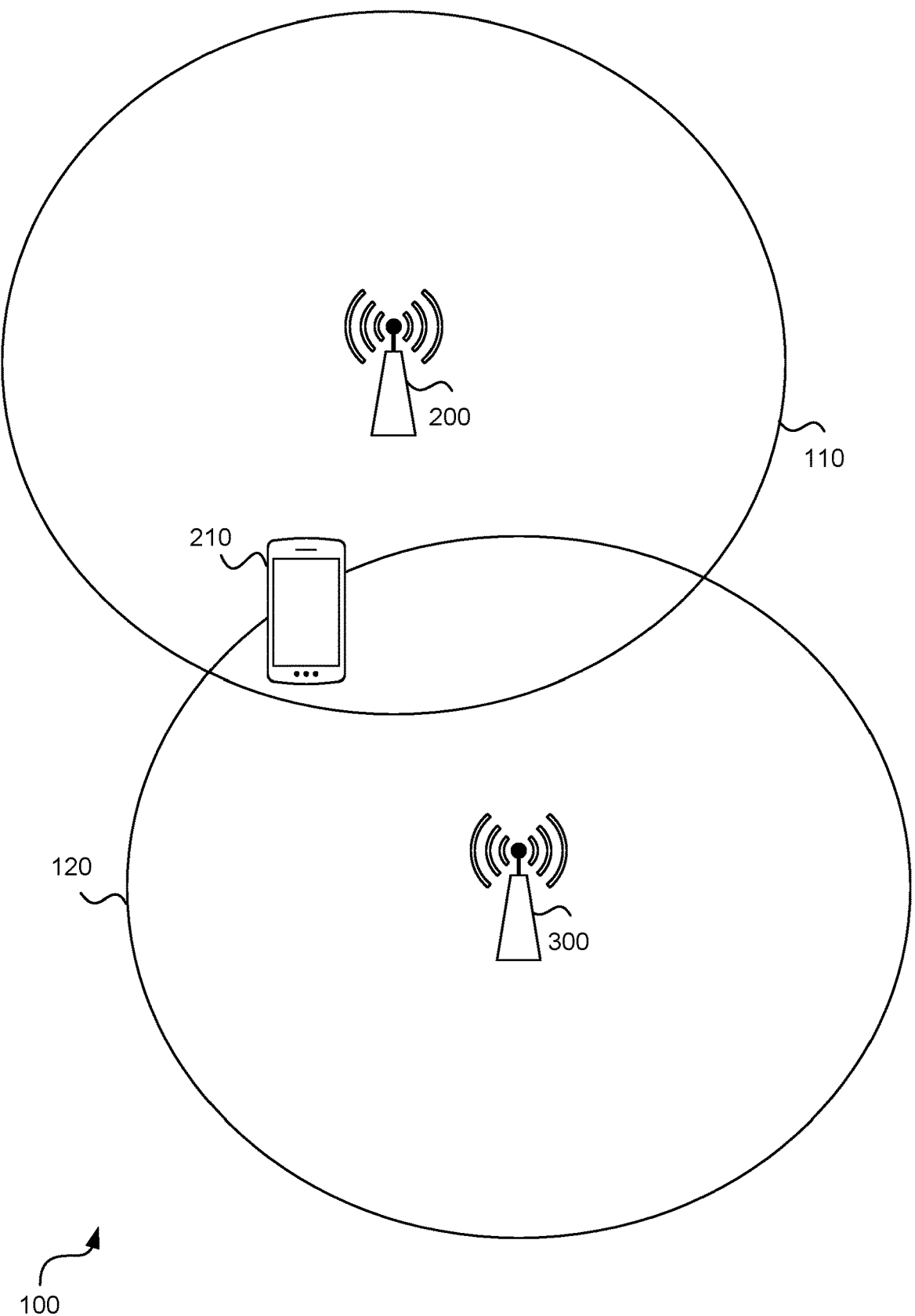
FIG. 1 shows an example embodiment of the subject matter described herein illustrating an example system, where various embodiments of the present disclosure may be implemented.

FIG. 1 illustrates an example system 100, where various embodiments of the present disclosure may be implemented. In at least some embodiments, the system 100 may comprise a fifth generation (5G) new radio (NR) system. Alternatively/additionally, the system 100 may comprise a non-terrestrial network (NTN). Accordingly, it may be desirable to enable various network technologies, such as the 5G NR, to support the usage of NTN within the context of cellular networks. NTNs may be able to provide seamless coverage e.g. on remote areas, such as deserts, islands and open ocean, and/or in disaster situations, or the like, by utilizing satellites as the base station or gNB in 5G networks. Alternatively/additionally, the system 100 may comprise a narrowband internet of things (NB-IoT) based network and/or an enhanced machine type communication (eMTC) based network.

An example representation of the system 100 is shown depicting a network node device 200, client device 210, a current cell 110, and a neighboring cell 120. In embodiments comprising the NTN, the network node device 200 may correspond to, be included in, or routed through a satellite.

Herein, the term "current cell" refers to a cell which the client device 210 has either currently established a data communication link with or which the client device 210 has started an initial access procedure with. The current cell 110 is served by the network node device 200. The neighboring cell 120 may be served e.g. by a network node device 300.

The client device 210 may include e.g. a mobile phone, a smartphone, a tablet computer, a smart watch, or any handheld or portable device. The client device 210 may also be referred to as a user equipment (UE). In embodiments comprising the NTN, the client device 200 may communicate with the network node device 200 via e.g. an air/space borne node communication connection, such as a service link.

In at least some of the embodiments comprising the 5G NR system, an initial access procedure of the client device 200 may comprise downlink (DL) time synchronization. The DL time synchronization may comprise the client device 200 detecting a primary synchronization signal (PSS) and a secondary synchronization signal (SSS) sent by the network node device 200, and the client device 200 decoding a physical broadcast channel (PBCH). In 5G NR, the pair of PSS/SSS and PBCH may be transmitted together in a synchronization signal block (SSB). After detecting the strongest received PSS, the client device 200 may obtain symbol synchronization and can further decode the SSS. The sequence pair (PSS and SSS) provide radio frame synchronization, frequency synchronization, as well as information about a corresponding cell identification (ID) to the client device 200. After confirming correct decoding of the PBCH through a cyclic redundancy check (CRC), initial synchronization may be considered as completed by the client device 200.

Conventionally, cellular terrestrial networks conforming to standards like 5G NR, long-term evolution (LTE), etc. are typically non-synchronized when using frequency division duplex (FDD). This means that in neighboring cells, base stations (such as gNB/eNB) do not need to align their DL transmissions in time or follow any common time reference provided by a global navigation satellite system (GNSS) or a network time protocol (NTP). Relaxed time synchronization requirement between adjacent gNBs/eNBs is one of the advantages of FDD compared to time division duplex (TDD) deployments. However, even when using FDD, time synchronization between infrastructure nodes (such as base stations) may be needed if using advanced multi-antenna processing techniques, such as coordinated beamforming of coordinated multi-point joint transmission (JT CoMP).

Also conventionally, in the NTN propagation delays may be different and change with time due to individual feeder and serving link delays of different satellites. At the same time, carrier frequency offsets (CFOs), phase noise and other radio frequency (RF) impairments may be different due to the individual hardware components of the satellites. The Doppler shifts created by the movement of different satellites may also be changing with time, creating thus an additional source of frequency synchronization misalignment. Moreover, in NTN, synchronization requirements between neighboring cells may change, as there may not be a strict time synchronization requirement if different carrier frequencies should be used.

Overall, in NTN, some neighboring cells of a current cell may be synchronized at a satellite reference point, and some may not be synchronized. Traditionally, the exact information about the synchronization status of the neighboring cells has not been fully available to the client devices. Moreover, a physical cell ID has traditionally not been mapped to a physical satellite or beam of a satellite, which implies that by only knowing the satellite or the satellite beam via e.g. satellite ephemeris, does not provide information about the synchronization status of the neighboring cells.

Due to the above, before attaching to a cell, a client device traditionally has not had information on the synchronization status of the cell, including what source the cell uses to derive its time reference (e.g. GNSS, network-based synchronization, etc.), where the beginning of frame (BOF) lies in time, when within the frame the SSB/SSB block is transmitted, or whether the neighboring cell is time-synchronized to any other neighboring cells or not.

At least some of the disclosed example embodiments may allow synchronization information determination with respect to neighboring cells. For example, if an initial access procedure towards a potential (first) cell fails, the client device typically starts an initial access towards another (second) cell by trying to detect and decode another PSS/SSS pair. However, during its attempt towards the first cell, the client device may have already detected and decoded one or more SSBs from that first cell, which have provided to the client device information on the time reference used by the first cell. Similarly, the client device may also have prior time and/or frequency synchronization information if before its attempt to access the first cell it was connected to another (third) cell. However, traditionally it is not known to the client device whether it can still make use of the timing obtained through SSB decoding from the first cell or from the previous (third) serving cell when it attempts to access the second cell. By knowing when to expect an SSB from the second cell, and furthermore which PSS sequence this SSB includes, the client device would be able to limit the search space in terms of location within the radio frame and in terms of the PSS sequence to detect. At the same time, knowing where the SSB is transmitted in frequency, can prevent the client device from searching within the full reception bandwidth. Knowledge about the evolution of delay and Doppler shift due to the satellite mobility may also help the client device. Thus, an advantage is that the search time and computational complexity of the overall synchronization procedure may be significantly reduced.

Accordingly, at least some of the disclosed example embodiments may allow assisting the client device in its synchronization procedure by providing synchronization information about neighboring cells through other cells in non-terrestrial networks.

Figure 2A:
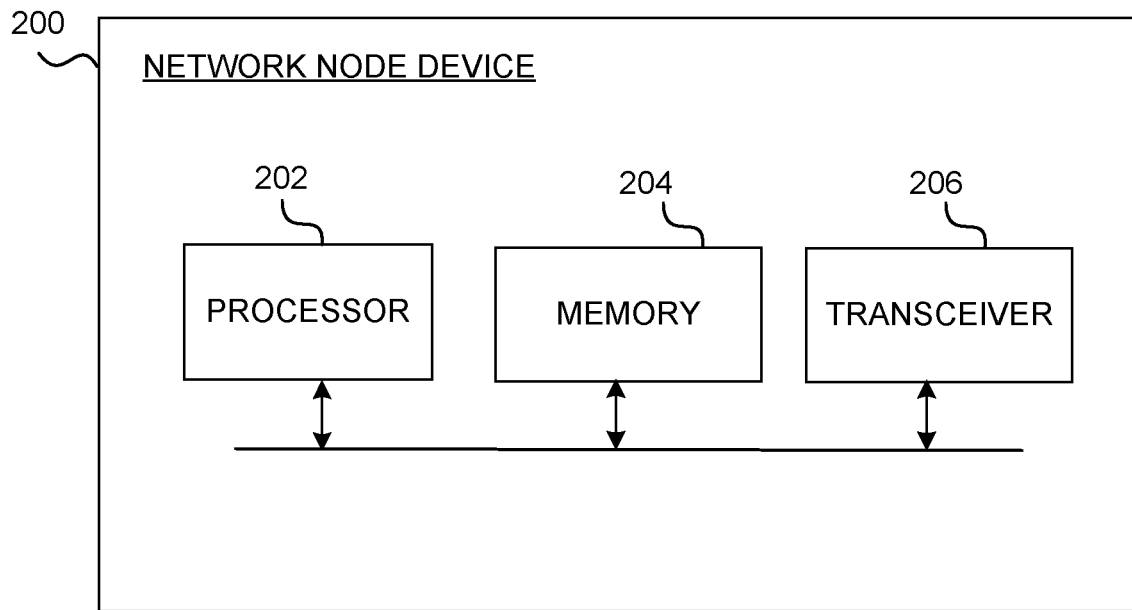
FIG. 2A shows an example embodiment of the subject matter described herein illustrating a network node device.

FIG. 2A is a block diagram of a network node device 200, in accordance with an example embodiment.

The network node device 200 comprises means 202, 204 for causing the performance of the network node device 200. The means 202, 204 may comprise one or more processors 202 and one or more memories 204 that comprise computer program code. The at least one memory 204 and computer program code may be configured to, with the at least one processor 202, cause the performance of the network node device 200. The network node device 200 may also include other elements, such as a transceiver 206.

Although the network node device 200 is depicted to include only one processor 202, the network node device 200 may include more processors. In an embodiment, the memory 204 is capable of storing instructions, such as an operating system and/or various applications. Furthermore, the memory 204 may include a storage that may be used to store e.g. at least some of the enhanced synchronization information used the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hardcoded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and nonvolatile memory devices. For example, the memory 204 may be embodied as semiconductor memories (such as mask ROM, PROM (programmable ROM), EPROM (erasable PROM), flash ROM, RAM (random access memory), etc.).

The network node device 200 may be a base station. The base station may include e.g. a fifth-generation base station (gNB) or any such device providing an air interface for client devices to connect to the wireless network via wireless transmissions. In at least some embodiments, the base station may be suitable for implementation in a satellite.

The means 202, 204 are configured to perform determining enhanced synchronization information related to the at least one neighboring cell 120 of the current cell 110 served by the network node device 200.

For example, the enhanced synchronization information may comprise a physical cell identification (ID) of each of the at least one neighboring cell 120. The client device 210 may use the physical cell ID to determine which PSS and SSS sequences to search for.

Alternatively/additionally, the enhanced synchronization information may comprise a frame synchronization status that indicates whether each of the at least one neighboring cell 120 is frame synchronized with the current cell 110 (i.e. the cell which provides the enhanced synchronization information). For example, the frame synchronization status may be indicated with one bit. Each of the at least one neighboring cell 120 may be associated with a cell ID, such as a physical cell ID (PCI).

Alternatively/additionally, the enhanced synchronization information may comprise a frame synchronization time offset (synch_offset) between each of the at least one neighboring cell 120 and the current cell 110. For example, if a neighboring cell 120 is not synchronized with the current cell 110 in the sense of frame synchronization, the synch_offset may be provided, measured e.g. in slots or symbols.

Alternatively/additionally, the enhanced synchronization information may comprise a synchronization signal block time offset (SSB_offset) within a frame between each of the at least one neighboring cell 120 and the current cell 110. Considering that each cell may transmit the SSB/SSB burst in a different location within the frame, it may happen that two cells use the same original synchronization and are frame-synchronized, but still do not align their SSB transmissions in time. For example in that case, the SSB_offset indicating the SSB/SSB burst offset between the current and neighboring cells may be provided. This metric may be defined as the difference of the first SSB (or SSB burst) location within the frame between the current and neighboring cells, measured e.g. in slots or symbols. Since the SSB offset (which may be defined as the difference between the beginning of frame (BOF) and the first SSB (or SSB burst) location in the frame) can be (pre-)configured per cell, the relative SSB offset may be provided by the current cell, instead of the difference of the BOF between the different cells. In case of non-synchronized cells, a single time offset can optionally be indicated, capturing or combining both synch_offset and SSB_offset.

Alternatively/additionally, the enhanced synchronization information may comprise a frequency offset between synchronization signal blocks in each of the at least one neighboring cell 120 and the current cell 110. For example, the frequency offset between the SSB in the current cell and the neighboring cells may be measured in resource blocks. The frequency offset may be due to a different bandwidth part (BWP) activation, a different carrier, or the like. If the SSBs are sent on a same frequency location, the value of the frequency offset may be set to e.g. zero.

Alternatively/additionally, the enhanced synchronization information may comprise a time stamp that indicates when the enhanced synchronization information is valid. For example, the time stamp information may indicate to the client device when the time offsets (synch_offset and/or SSB_offset) are valid. In a case of the cells being on different satellites, and the ephemeris data being available to the client device in at least some embodiments as discussed below, the client device may calculate the time offset (synch_offset and/or SSB_offset) as well as Doppler shift (from both feeder and serving links) for a later point in time. The time stamp may be given e.g. in accordance with a known reference, such as coordinated universal time (UTC).

Table 1 below shows an example of the enhanced synchronization information provided by the network to the client device(s). In the example, Cell ID #1 represents a synchronized cell and Cell ID #2 represents a non-synchronized cell.

Advantages of providing this enhanced synchronization information to the client device(s) may include at least some of the following:
- the client device knows which exact PSS/SSS sequences to search for, as the PSS/SSS is directly associated with the physical cell ID,
- the client device knows where in time and frequency to expect and search for the particular PSS/SSS and SSB,
- in an attempt to access a new cell, the client device can easily synchronize to the new cell and determine the BOF,
- in the frequency domain, if there is a frequency shift between the SSB block, the client device is aware of it and may search for the corresponding PSS/SSS in the right frequency band/BWP,
- based on the received synchronization information, and together with the ephemeris data, the client device may predict the time offset (due to propagation delay changes and knowing the locations of the satellites), as well as frequency offset (due to Doppler shift changes) for a neighboring cell covered by a different satellite, and/or
- for performing neighboring cell measurements, such as reference signal received power (RSRP) measurements based on the SSB, the client device may position the measurement window depending on the SSB location in time and frequency.

The means 202, 204 are further configured to perform causing the network node device 200 to transmit the determined enhanced synchronization information via downlink signaling to the at least one client device 210 located in the current cell 110.

For example, the downlink signaling may comprise broadcast signaling via a physical broadcast channel (PBCH). For example, the determined enhanced synchronization information may be broadcast via the PBCH to all the client devices 210 in the current cell 110. This feature allows the enhanced synchronization information to be available early, i.e. already after a single SSB detection. By detecting an SSB from a new cell, the client device immediately knows the synchronization status of the neighboring cells to that cell. In at least some embodiments, the enhanced synchronization information may be made available to all the client devices and included in every PBCH transmission.

Alternatively/additionally, the downlink signaling may comprise signaling via a physical downlink control channel (PDCCH). For example, the determined enhanced synchronization information may be provided to the client device via the PDCCH, which may then be decoded by the client device (this may also happen in an RRC_idle state). Transmission of additional information may be triggered by client device measurements sent to the network, e.g. when a predefined indicator such as an RSRP falls below a pre-

TABLE 1

| Cell ID | Yes/No (neighboring cell frame-synchronized with transmitting cell) | Synch_offset | SSB_offset | Frequency offset | Time stamp |
|---|---|---|---|---|---|
| Cell_ID#1 | 1 (yes) | N/A | Value Y | Value V | N/A |
| Cell_ID#2 | 0 (no) | Value X | Value Z | Value G | Value W | defined threshold. This feature allows the enhanced synchronization information to be sent to the client devices only when needed or requested.

Alternatively/additionally, the downlink signaling may comprise radio resource control (RRC) signaling. For example, the determined enhanced synchronization information may be included in the RRC signaling. This feature allows more efficiency with regards to overhead. The enhanced synchronization information may be provided later than in the above other two cases (PBCH and PDCCH), and may be made available to a client device e.g. if the client device was previously in a RRC_CONNECTED state in a neighboring cell.

Alternatively/additionally, the downlink signaling may comprise ephemeris data signaling when the network node device 200 and the at least one client device 210 communicate at least partially via the air/space borne node communication connection. Herein, the air/space borne node communication connection may comprise a satellite communication connection (e.g. through low-earth orbit (LEO) and/or geostationary (GEO) satellites) and/or a high-altitude platform station (HAPS) communication connection. A HAPS communication connection is also known as a high-altitude pseudo-satellite communication connection.

At least in some example embodiments, the network node device 200 and the at least one client device 210 may communicate at least partially via the above-described air/space borne node communication connection, and the air/space borne node may be utilized as a synchronization reference for the enhanced synchronization information. For example, provided the offset between two SSBs of two cells served through different satellites is obtained, the client device 210 may calculate the place of the SSB in the neighboring cell. The client device 210 may do this e.g. when the client device 210 knows the positions of the satellites (the ephemeris data), knows its own position, and knows the offset at the time of the timestamp. Based on this knowledge, the client device 210 may be able to calculate how the delays to the satellites have evolved, and thereby calculate the location of the SSB. In addition, when the air/space borne node is utilized as the synchronization reference for the enhanced synchronization information, the client device 210 may be able to compensate for feeder link delay changes.

For example, the determined enhanced synchronization information may be included in the ephemeris data. In 5G NR, the satellite ephemeris data may include a satellite ID, a satellite location, and/or a satellite movement vector, allowing the client device to determine where a satellite is at any point in time. In case a mapping from a satellite ID to a PCI is made, e.g. two alternative embodiments may be used:
 a. using the PCI-satellite ID mapping of the ephemeris data and the location the client device, the client device may predict the neighbor PCIs; or
 b. in addition to the PCI-satellite ID mapping there may be information indicating the synchronization among PCIs as part of the ephemeris.

Figure 2B:
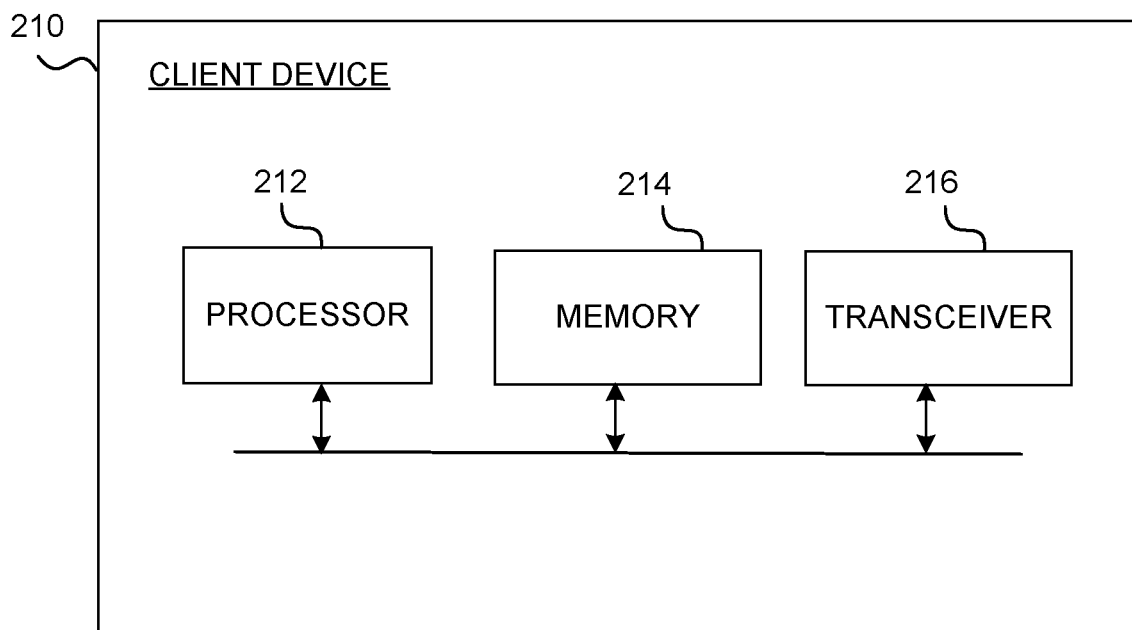
FIG. 2B shows an example embodiment of the subject matter described herein illustrating a client device.

FIG. 2B is a block diagram of the client device 210, in accordance with an example embodiment.

The client device 210 comprises means 212, 214 for causing the performance of the client device 210. The means 212, 214 may comprise one or more processors 212 and one or more memories 214 that comprise computer program code. The at least one memory 214 and computer program code may be configured to, with the at least one processor 212, cause the performance of the client device 210. The client device 210 may also include other elements, such as a transceiver 216.

Although the client device 210 is depicted to include only one processor 212, the client device 210 may include more processors. In an embodiment, the memory 214 is capable of storing instructions, such as an operating system and/or various applications. Furthermore, the memory 214 may include a storage that may be used to store e.g. at least some of the enhanced synchronization information and/or synchronization status data used the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 212 may be configured to execute hardcoded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and nonvolatile memory devices. For example, the memory 214 may be embodied as semiconductor memories (such as mask ROM, PROM (programmable ROM), EPROM (erasable PROM), flash ROM, RAM (random access memory), etc.).

The client device 210 may be any of various types of devices used directly by an end user entity and capable of communication in a wireless network, such as user equipment (UE). Such devices include but are not limited to smartphones, tablet computers, smart watches, lap top computers, Internet-of-Things (IoT) devices, etc.

The means 212, 214 are configured to perform causing the client device 210 to receive, via downlink signaling, the enhanced synchronization information related to the at least one neighboring cell 120 of the current cell 110 in which the client device 210 is currently located. As discussed above, the enhanced synchronization information may comprise the physical cell identification of each of the at least one neighboring cell 120, the frame synchronization status indicating whether each of the at least one neighboring cell 120 is frame synchronized with the current cell 110, the frame synchronization time offset between each of the at least one neighboring cell 120 and the current cell 110, the synchronization signal block time offset within a frame between each of the at least one neighboring cell 120 and the current cell 110, the frequency offset between synchronization signal blocks in each of the at least one neighboring cell 120 and the current cell 110, and/or the time stamp indicating when the enhanced synchronization information is valid. As also discussed above, the downlink signaling may comprise the broadcast signaling via the physical broadcast channel, the signaling via the physical downlink control channel, the radio resource control signaling, and/or the ephemeris data signaling when the client device 210 and the network node device 200 serving the current cell 110 communicate at least partially via the air/space borne node communication connection.

The means 212, 214 are further configured to perform determining synchronization status data of the at least one neighboring cell 120 with respect to the current cell 110, based on the received enhanced synchronization information.

For example, the synchronization status data may comprise first synchronization status data that indicates which synchronization signal is utilized by each of the at least one neighboring cell 120.

Alternatively/additionally, the synchronization status data may comprise second synchronization status data that indicates whether each of the at least one neighboring cell 120 is frame synchronized with the current cell 110.

Alternatively/additionally, the synchronization status data may comprise third synchronization status data that indicates where in time a synchronization signal is being transmitted by each of the at least one neighboring cell 120.

In other words, based on an ID of a neighboring cell, the client device 210 may know at least some of the following: which PSS/SSS is utilized by the neighboring cell, whether the neighboring cell is frame-synchronized with the current cell, and where in time the PSS/SSS is being transmitted by the neighboring cell.

In response to triggering a cell selection procedure, the means 212, 214 may further be configured to perform performing an accelerated search for at least one of the at least one neighboring cell 120, based on the determined synchronization status data. In this context, the cell selection procedure may also comprise cell reselection. In at least some example embodiments, the cell (re)selection procedure being triggered may comprise an initial access procedure with the current cell 110 failing, and/or the client device 210 attempting to reselect or perform an initial cell selection of a neighbor cell after having previously received the enhanced synchronization information. For example, when the neighboring cell 120 uses the same timing as the current cell 110 (or another cell previously connected to), and/or when the relative synch_offset and SSB_offset is provided to the client device 210, the client device 210 is able to search for the PSS in an accelerated manner, decode the SSB, and attach to the neighboring cell 120.

Further features (such as those related to the enhanced synchronization information and the downlink signaling) of the client device 210 directly result from the functionalities and parameters of the network node device 200 and thus are not repeated here.

Figure 3:
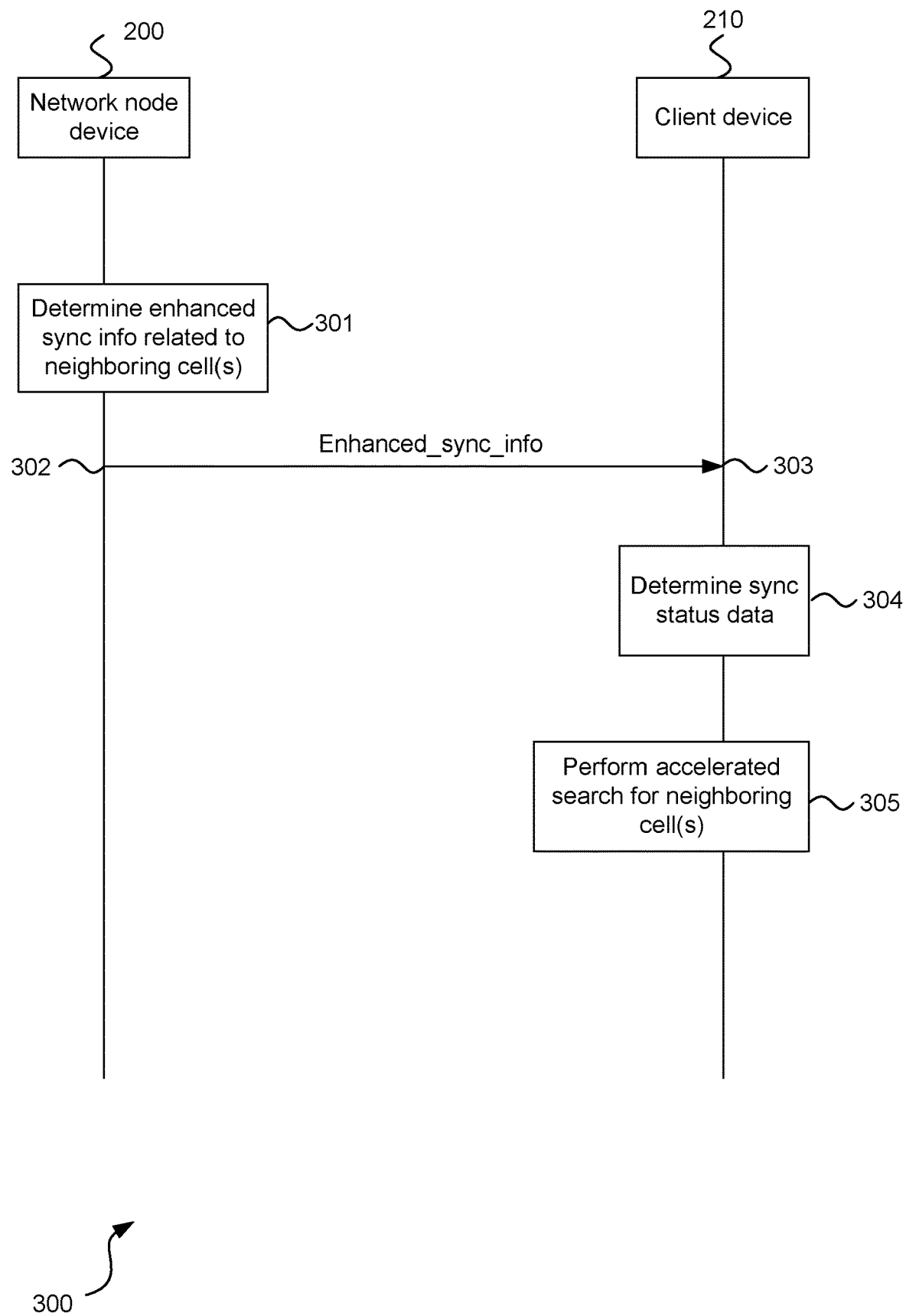
FIG. 3 shows an example embodiment of the subject matter described herein illustrating a method.

FIG. 3 illustrates an example signaling diagram of a method 300, in accordance with an example embodiment.

In operation 301, a network node device determines enhanced synchronization information that is related to at least one neighboring cell of a current cell served by the network node device.

In operation 302, the network node device transmits the determined enhanced synchronization information via downlink signaling to at least one client device located in the current cell.

In operation 303, the client device receives, via the downlink signaling, the enhanced synchronization information related to the at least one neighboring cell of the current cell in which the client device is currently located.

In operation 304, the client device determines synchronization status data of the at least one neighboring cell with respect to the current cell, based on the received enhanced synchronization information.

In optional operation 305, the client device may perform performing an accelerated search for at least one of the at least one neighboring cell based on the determined synchronization status data, in response to triggering a cell selection procedure.

The method 300 may be performed by the network node device 200 of FIG. 2A and the client device 210 of FIG. 2B. The operations 301-302 can, for example, be performed by the at least one processor 202 and the at least one memory 204. The operations 303-305 can, for example, be performed by the at least one processor 212 and the at least one memory 214. Further features of the method 300 directly result from the functionalities and parameters of the network node device 200 and the client device 210 and thus are not repeated here. The method 300 can be performed by computer program(s).

Figure 4:
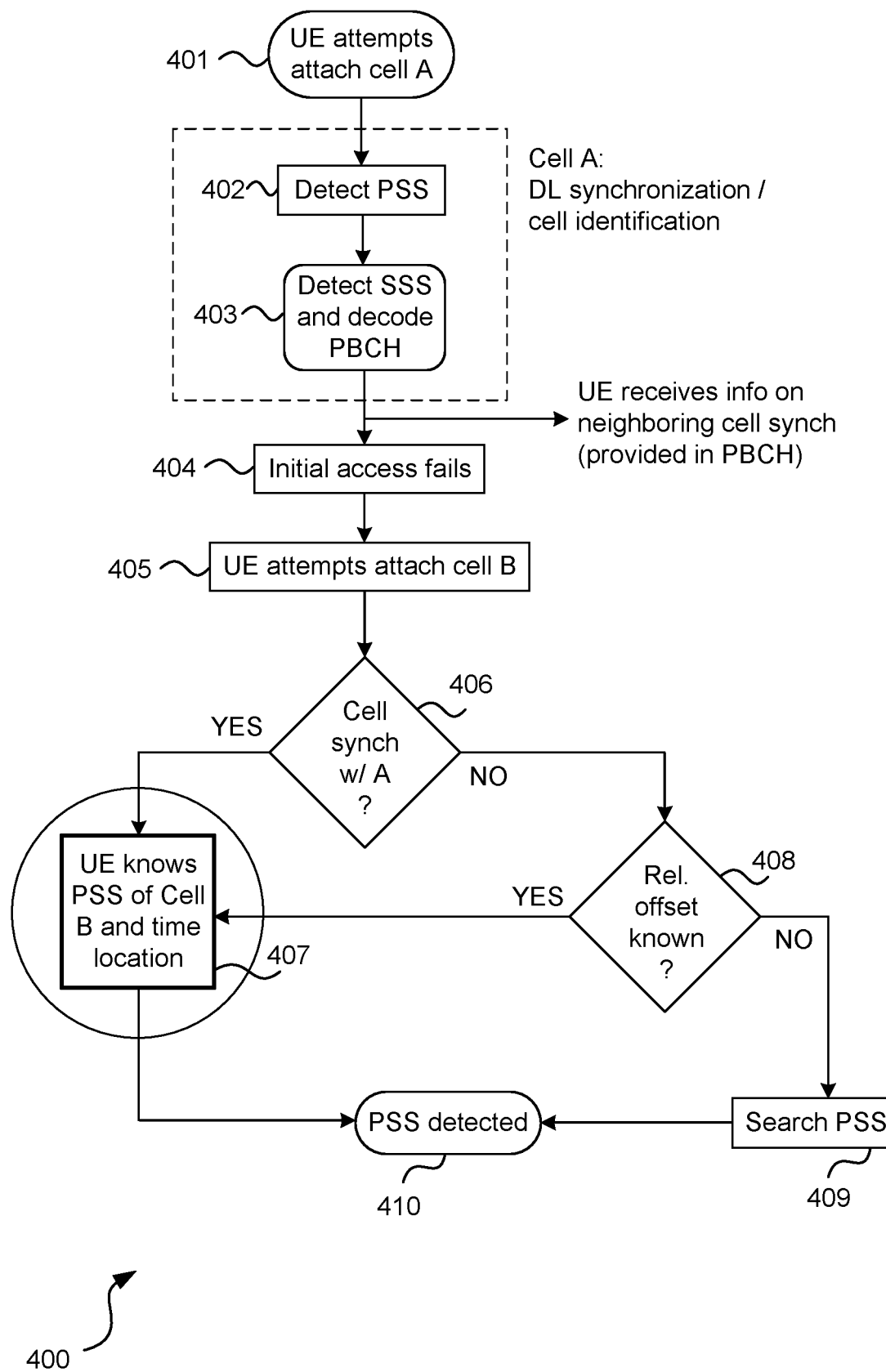
FIG. 4 shows an example embodiment of the subject matter described herein illustrating another method.

FIG. 4 illustrates an example flow chart of a method 400, in accordance with an example embodiment. The example of FIG. 4 is from the point of view of the client device 210, for a scenario in which the initial access (operations 401-403) of the client device 210 to cell A fails (operation 404) and the client device 210 attempts to access cell B at operation 405. In the example of FIG. 4, the enhanced synchronization information is included in the PBCH of the SSB. Thus, the client device 210 decodes the SSB from cell A (operation 403) and thus receives synchronization information about neighboring cells. It is to be noted that the client device 210 may also have such information if it was previously attached to (or attempted to connect) another neighboring cell. Based on the ID of cell B, the client device 210 knows which PSS/SSS is utilized by cell B (operation 407), whether cell B is frame-synchronized with cell A (operation 406) and where in time the PSS/SSS is being transmitted by cell B (also operation 407). If cell B uses the same timing as cell A (or another cell which the client device 210 was previously attached to), or if the relative synch_offset and SSB_offset is provided to the client device 210 (operation 408), the client device 210 may search for the PSS (operation 409), decode the SSB and attach to cell B (operation 410). Thus, in the example of FIG. 4, the circle to the left indicates a scenario in which the client device 210 using at least some of the disclosed features is aware of SSB time-frequency location and/or PSS/SSS sequences cell B, and thus may complete the PSS detection faster compared to the "search PSS" procedure in the lower right corner.

At least some of the disclosed example embodiments allow assisting a client device 210 in its procedure of downlink synchronization/initial access to a network infrastructure with more than one infrastructure nodes (e.g. gNBs). When the client device 210 attempts to access the network infrastructure, it is assisted by additional information provided earlier by the network node device 200, in order to perform faster and better time synchronization/initial access process. In at least some of the disclosed example embodiments, the client device 210 knows which synchronization sequences (PSS/SSS) to search for, as these are directly associated with the physical cell ID (also provided). In at least some of the disclosed example embodiments, the client device 210 knows which neighboring cells are frame-synchronized. In at least some of the disclosed example embodiments, the client device 210 knows where in time and frequency to expect and search for the particular PSS/SSS. In at least some of the disclosed example embodiments, the client device 210 is able to synchronize to the new cell and determine the frame start, in an attempt to access a new cell. In at least some of the disclosed example embodiments, in combination with the ephemeris data, the client device 210 is able to predict a time offset (due to propagation delay changes and knowing the locations of the satellites), as well as a frequency offset (due to Doppler shift changes) for a neighboring cell covered by a different satellite. In at least some of the disclosed example embodiments, the client device 210 is able to position the measurement window depending on the provided SSB location in order to perform neighboring cell measurements such as RSRP measurements based on the SSB.

The functionality described herein can be performed, at least in part, by one or more computer program product components such as software components. According to an embodiment, the network node device 200 and/or client device 210 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A network node device, comprising:
at least one processor; and
at least one memory including computer program code, the at least one memory and computer program code configured to, with the at least one processor, cause the network node device to perform:
determining enhanced synchronization information related to at least one neighboring cell of a current cell served by the network node device; and
transmitting the determined enhanced synchronization information via downlink signaling to at least one client device located in the current cell,
wherein the determined enhanced synchronization information is transmitted to the at least one client device at least partially via an air/space borne node communication connection, and the air/space borne node is utilized as a synchronization reference for the enhanced synchronization information,
wherein the enhanced synchronization information comprises:
a frame synchronization status indicating whether each of the at least one neighboring cell is frame synchronized with the current cell; and
a frame synchronization time offset between each of the at least one neighboring cell and the current cell.

2. The network node device according to claim 1, wherein the enhanced synchronization information further comprises:
a synchronization signal block time offset within a frame between each of the at least one neighboring cell and the current cell;
a frequency offset between synchronization signal blocks in each of the at least one neighboring cell and the current cell; and
a time stamp indicating when the enhanced synchronization information is valid.

3. The network node device according to claim 2, wherein the downlink signaling comprises:
broadcast signaling via a physical broadcast channel;
signaling via a physical downlink control channel;
radio resource control signaling; and
ephemeris data signaling when the network node device and the at least one client device communicate at least partially via an air/space borne node communication connection.

4. The network node device according to claim 3, wherein the frequency offset between the synchronization signal blocks in the current cell and the neighboring cells are measured in resource blocks.

5. A method, comprising:
determining, by a network node device, enhanced synchronization information related to at least one neighboring cell of a current cell served by the network node device; and
transmitting, by the network node device, the determined enhanced synchronization information via downlink signaling to at least one client device located in the current cell,
wherein the determined enhanced synchronization information is transmitted to the at least one client device at least partially via an air/space borne node communication connection, and the air/space borne node is utilized as a synchronization reference for the enhanced synchronization information, wherein the enhanced synchronization information comprises:

a frame synchronization status indicating whether each of the at least one neighboring cell is frame synchronized with the current cell; and a frame synchronization time offset between each of the at least one neighboring cell and the current cell.

6. A client device, comprising:

at least one processor; and at least one memory including computer program code, the at least one memory and computer program code configured to, with the at least one processor, cause the client device to perform:

receiving, via downlink signaling, enhanced synchronization information related to at least one neighboring cell of a current cell in which the client device is currently located;

and determining synchronization status data of the at least one neighboring cell with respect to the current cell based on the received enhanced synchronization information, wherein the at least one memory and computer program code are further configured, with the at least one processor, to cause the client device to perform:

in response to triggering a cell selection procedure, performing an accelerated search for at least one of the at least one neighboring cell based on the determined synchronization status data;

wherein the enhanced synchronization information comprises:

a frame synchronization status indicating whether each of the at least one neighboring cell is frame synchronized with the current cell; and a frame synchronization time offset between each of the at least one neighboring cell and the current cell.

7. The client device according to claim 6, wherein the frame synchronization status is indicated with one bit and each of the at least one neighboring cell is associated with a physical cell ID (PCI), and wherein, if a neighboring cell is not synchronized with the current cell in the sense of frame synchronization, the synch offset is provided, measured in slots or symbols.

8. The client device according to claim 6, wherein the enhanced synchronization information further comprises:

a synchronization signal block time offset within a frame between each of the at least one neighboring cell and the current cell;

a frequency offset between synchronization signal blocks in each of the at least one neighboring cell and the current cell, wherein the frequency offset is measured in resource blocks; and a time stamp indicating when the enhanced synchronization information is valid, wherein in a case of the cells being on different satellites, and ephemeris data being available to the client device, the client device calculates the time offset (synch offset and/or synchronization signal block offset) and a Doppler shift (from both feeder and serving links) for a later point in time, wherein the time stamp is given in accordance with a known reference.

9. The client device according to claim 6, wherein the downlink signaling comprises:

broadcast signaling via a physical broadcast channel;

signaling via a physical downlink control channel;

radio resource control signaling; and ephemeris data signaling when the client device and a network node device serving the current cell communicate at least partially via an air/space borne node communication connection.

10. The client device according to claim 6, wherein the synchronization status data comprises:

first synchronization status data indicating which synchronization signal is utilized by each of the at least one neighboring cell;

second synchronization status data indicating whether each of the at least one neighboring cell is frame synchronized with the current cell; and third synchronization status data indicating where in time a synchronization signal is being transmitted by each of the at least one neighboring cell.

11. The client device according to claim 9, wherein the air/space borne node communication connection comprises a satellite communication connection through low-earth orbit (LEO) and/or geostationary (GEO) satellites and/or a high-altitude platform station (HAPS) communication connection.

* * * * *